US007329363B2

(12) United States Patent
Lim et al.

(10) Patent No.: US 7,329,363 B2
(45) Date of Patent: Feb. 12, 2008

(54) METHOD OF FORMING A HYDROPHOBIC COATING LAYER ON A SURFACE OF A NOZZLE PLATE FOR AN INK-JET PRINTHEAD

(75) Inventors: Seung-mo Lim, Yongin-si (KR); Kyung-hee You, Suwon-si (KR); Jae-woo Chung, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 405 days.

(21) Appl. No.: 11/064,827

(22) Filed: Feb. 25, 2005

(65) Prior Publication Data

US 2005/0190231 A1 Sep. 1, 2005

(30) Foreign Application Priority Data

Feb. 27, 2004 (KR) ..................... 10-2004-0013562

(51) Int. Cl.
*G11B 5/27* (2006.01)

(52) U.S. Cl. ............................ 216/27; 216/39; 216/47

(58) Field of Classification Search ..................... None
See application file for complete search history.

(56) References Cited

U.S. PATENT DOCUMENTS

| | | | | |
|---|---|---|---|---|
| 4,007,464 | A * | 2/1977 | Bassous et al. | 347/47 |
| 5,387,440 | A * | 2/1995 | Takemoto et al. | 427/443.1 |
| 5,417,897 | A * | 5/1995 | Asakawa et al. | 264/400 |
| 5,426,458 | A * | 6/1995 | Wenzel et al. | 347/45 |
| 5,455,613 | A * | 10/1995 | Canfield et al. | 347/65 |
| 5,493,320 | A * | 2/1996 | Sandbach et al. | 347/47 |
| 5,563,642 | A * | 10/1996 | Keefe et al. | 347/84 |
| 5,598,193 | A * | 1/1997 | Halko et al. | 347/45 |
| 5,859,654 | A * | 1/1999 | Radke et al. | 347/45 |
| 5,874,974 | A * | 2/1999 | Courian et al. | 347/65 |
| 6,062,679 | A * | 5/2000 | Meyer et al. | 347/63 |
| 6,074,040 | A * | 6/2000 | Usui et al. | 347/45 |
| 6,179,413 | B1 * | 1/2001 | Coulman et al. | 347/63 |
| 6,254,219 | B1 * | 7/2001 | Agarwal et al. | 347/47 |
| 6,296,344 | B1 * | 10/2001 | Sharma et al. | 347/45 |
| 6,325,490 | B1 * | 12/2001 | Yang et al. | 347/45 |
| 6,336,697 | B1 * | 1/2002 | Fukushima | 347/20 |
| 6,341,836 | B1 | 1/2002 | Koike et al. | 347/20 |
| 7,158,159 | B2 * | 1/2007 | Beerling et al. | 346/47 |
| 2005/0068367 | A1 * | 3/2005 | Kato et al. | 347/45 |

FOREIGN PATENT DOCUMENTS

| | | |
|---|---|---|
| EP | 0 389 217 A2 | 9/1990 |
| EP | 0 389 217 A3 | 9/1990 |
| EP | 0 829 357 A1 | 3/1998 |
| EP | 0 931 656 A1 | 7/1999 |
| JP | 7-314693 | 12/1995 |
| JP | 10-235858 | 9/1998 |

* cited by examiner

*Primary Examiner*—Allan Olsen
(74) *Attorney, Agent, or Firm*—Lee & Morse, P.C.

(57) ABSTRACT

A method of forming a hydrophobic coating layer on a surface of a nozzle plate for an ink-jet printhead includes preparing a nozzle plate having a nozzle, forming a metal layer on a surface of the nozzle plate, forming a material layer covering the metal layer, selectively etching the material layer to expose a portion of the metal layer formed on an outer surface of the nozzle plate, and forming the hydrophobic coating layer of a sulfur compound on the exposed portion of the metal layer by dipping the nozzle plate in a sulfur compound-containing solution.

13 Claims, 4 Drawing Sheets

METHOD OF FORMING A HYDROPHOBIC COATING LAYER ON A SURFACE OF A NOZZLE PLATE FOR AN INK-JET PRINTHEAD

BACKGROUND OF THE INVENTION

1. Field of the Invention

The present invention relates to an ink-jet printhead. More particularly, the present invention relates to a method of forming a hydrophobic coating layer on a surface of a nozzle plate for an ink-jet printhead.

2. Description of the Related Art

Generally, an ink-jet printhead is a device that ejects small volume ink droplets at desired positions on a recording medium to print a desired color image. Ink-jet printheads are generally categorized into two types depending on which ink ejection mechanism is used. A first type is a thermal ink-jet printhead, in which ink is heated to form ink bubbles and the expansive force of the bubbles causes ink droplets to be ejected. A second type is a piezoelectric ink-jet printhead, in which a piezoelectric crystal is deformed to exert pressure on ink causing ink droplets to be ejected.

FIG. 1 illustrates a cross-sectional view of a conventional piezoelectric ink-jet printhead.

Referring to FIG. 1, a flow path plate 10 having ink flow paths including a manifold 13, a plurality of restrictors 12, and a plurality of pressurizing chambers 11 is formed. A nozzle plate 20 having a plurality of nozzles 22 at positions corresponding to the respective pressurizing chambers 11 is formed on a lower side of the flow path plate 10. In FIG. 1, only an exemplary one of each of the plurality of pressurizing chambers 11, restrictors 12, and nozzles 22, is shown. A piezoelectric actuator 40 is disposed on an upper side of the flow path plate 10. The manifold 13 is a common passage through which ink from an ink reservoir (not shown) is introduced into each of the plurality of pressurizing chambers 11. Each of the plurality of restrictors 12 is an individual passage through which ink from the manifold 13 is introduced into a respective pressurizing chamber 11. Each of the plurality of pressurizing chambers 11 is filled with ink to be ejected and collectively may be arranged at one or both sides of the manifold 13. Volumes of each of the plurality of pressurizing chambers 11 change according to the driving of the piezoelectric actuator 40, thereby generating a change of pressure to perform ink ejection or introduction. To generate this change in pressure, an upper wall of each pressurizing chamber 11 of the flow path plate 10 serves as a vibrating plate 14 that can be deformed by the piezoelectric actuator 40.

The piezoelectric actuator 40 includes a lower electrode 41, a piezoelectric layer 42, and an upper electrode 43, which are sequentially stacked on the flow path plate 10. A silicon oxide layer 31 is formed as an insulating film between the lower electrode 41 and the flow path plate 10. The lower electrode 41 is formed on the entire surface of the silicon oxide layer 31 and serves as a common electrode. The piezoelectric layer 42 is formed on the lower electrode 41 in a position corresponding to an upper side of each of pressurizing chamber 11. The upper electrode 43 is formed on the piezoelectric layer 42 and serves as a driving electrode for applying a voltage to the piezoelectric layer 42.

In an ink-jet printhead of the above-described construction, a water-repellent surface treatment for the nozzle plate 20 directly affects ink ejection performance, such as directionality and ejection speed of ink droplets to be ejected through the nozzles 22. More specifically, to enhance ink ejection performance, inner surfaces of the nozzles 22 must be hydrophilic and an outer surface of the nozzle plate 20, outside of the nozzles 22, must be water-repellent, i.e., hydrophobic.

In view of these requirements, it is common to form a hydrophobic coating layer on a surface of a nozzle plate. Various methods of forming such a hydrophobic coating layer are known. There are largely two types of conventional hydrophobic coating layer formation methods. A first type uses a coating solution for selective coating a surface of a specific material. A second type uses a nonselective coating solution.

FIG. 2 illustrates a conventional ink-jet printhead having a sulfur compound layer as a hydrophobic coating layer on a surface of a nozzle plate.

Referring to FIG. 2, initially, a metal layer 52 is formed on a surface of a nozzle plate 51 through which a nozzle 55 is bored. A sulfur compound layer 53 is then formed on a surface of the metal layer 52 by coating the metal layer 52 with a sulfur compound. After this coating, the sulfur compound should be coated only on the surface of the metal layer 52.

According to this conventional method, however, the metal layer 52 may also be formed on an inner surface of the nozzle 55, in addition to the outer surface of the nozzle plate 51. Further, when a large number of nozzles are used, the metal layer 52 may be non-uniformly formed at different areas of the nozzle plate 51 and different portions of the nozzle 55. In this case, the sulfur compound layer 53 is also formed on an inner surface of the nozzle 55 or is not uniformly formed. Resultantly, when the sulfur compound layer 53, which is a hydrophobic coating layer, is formed poorly, a periphery of the nozzle 55 may be easily contaminated by ink and ink droplet ejection performance may deteriorate due to low ejection speed or non-uniform ejection direction.

FIG. 3 illustrates a conventional ink-jet printhead having a fluorine resin-containing water-repellent layer on a surface of a nozzle plate.

Referring to FIG. 3, a water-repellent layer 90 is formed on a surface of a nozzle plate 70. The water-repellent layer 90 is composed of a nickel base 96, fluorine resin particles 94, and a hard material 98. A fluorine resin layer 92 is formed on a surface of the water-repellent layer 90. To form such a water-repellent layer 90, initially, a polymer resin 74 is filled in a nozzle 72. The water-repellent layer 90 is then formed on the surface of the nozzle plate 70 and the polymer resin 74 is removed. Accordingly, the water-repellent layer 90 is formed only on the surface of the nozzle plate 70.

However, this conventional method involves a cumbersome process to remove the polymer resin 74 filled in the nozzle 72.

Another conventional method discloses a method of forming a water-repellent layer on a surface of a nozzle plate while a gas is injected through a nozzle to prevent a water-repellent coating from forming on an inner surface of the nozzle. However, this method requires a complicated apparatus and a difficult process, which renders industrial application difficult.

SUMMARY OF THE INVENTION

The present invention is therefore directed to a method of forming a hydrophobic coating layer on a surface of a nozzle plate for an ink-jet printhead, which substantially overcomes one or more of the problems due to the limitations and disadvantages of the related art.

It is a feature of an embodiment of the present invention to provide a method of forming a hydrophobic coating layer on a surface of a nozzle plate for an ink-jet printhead that selectively forms a uniform hydrophobic coating layer only on an outer surface of a nozzle plate for an ink-jet printhead, thereby enhancing the ejection performance of ink droplets through a nozzle and improving print quality.

It is another feature of an embodiment of the present invention to provide a method of forming a hydrophobic coating layer on a surface of a nozzle plate for an ink-jet printhead that is simplified as compared to conventional methods.

At least one of the above and other features and advantages of the present invention may be realized by providing a method of forming a hydrophobic coating layer on a surface of a nozzle plate for an ink-jet printhead includes preparing a nozzle plate having a nozzle, forming a metal layer on a surface of the nozzle plate, forming a material layer covering the metal layer, selectively etching the material layer to expose a portion of the metal layer formed on an outer surface of the nozzle plate, and forming the hydrophobic coating layer of a sulfur compound on the exposed portion of the metal layer by dipping the nozzle plate in a sulfur compound-containing solution.

The nozzle plate may be a silicon wafer. The method may further include forming an insulating layer on a surface of the nozzle plate and an inner surface of the nozzle, prior to forming the metal layer. The insulating layer may be a silicon oxide layer.

Alternatively, the nozzle plate may be selected from the group consisting of a glass substrate and a metal substrate.

Forming the metal layer may include performing one of sputtering and E-beam evaporation.

The metal layer may include at least a metal selected from the group consisting of gold (Au), silver (Ag), copper (Cu), and indium (In). The metal layer may preferably include gold.

The method may further include rotating the nozzle plate while forming the metal layer.

Forming the material layer may include performing plasma-enhanced chemical vapor deposition (PE-CVD).

The material layer may be a silicon oxide layer.

Etching the material layer may include performing Reactive Ion Etching (RIE).

The sulfur compound may be a thiol compound.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Figure 1:
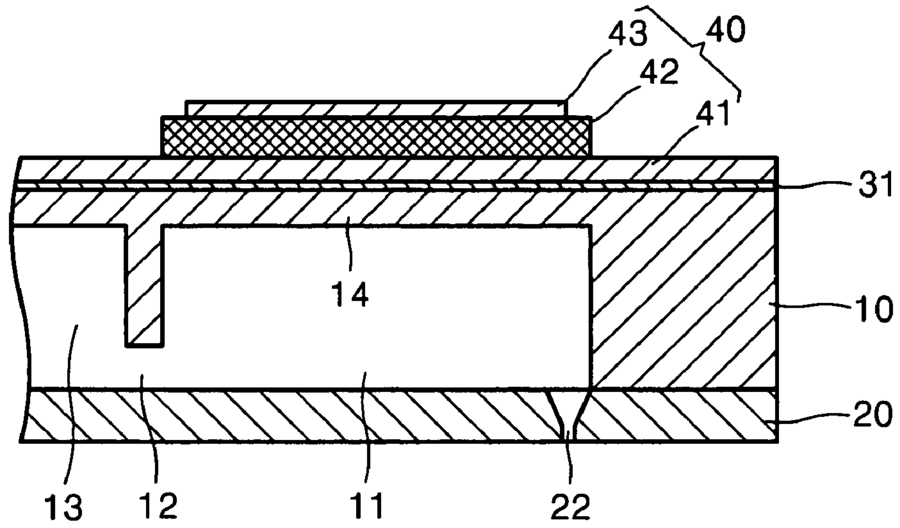
FIG. 1 (PRIOR ART)
FIG. 1 illustrates a cross-sectional view of a conventional piezoelectric ink-jet printhead.
Figure 2:
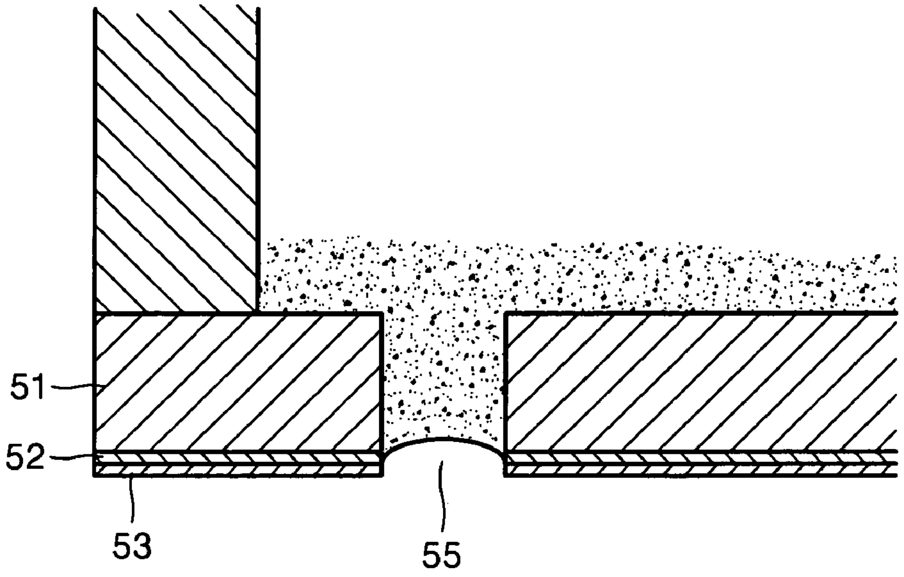
FIG. 2 (PRIOR ART)
FIG. 2 illustrates a cross-sectional view of a conventional ink-jet printhead having a sulfur compound layer as a hydrophobic coating layer on a surface of a nozzle plate.
Figure 3:
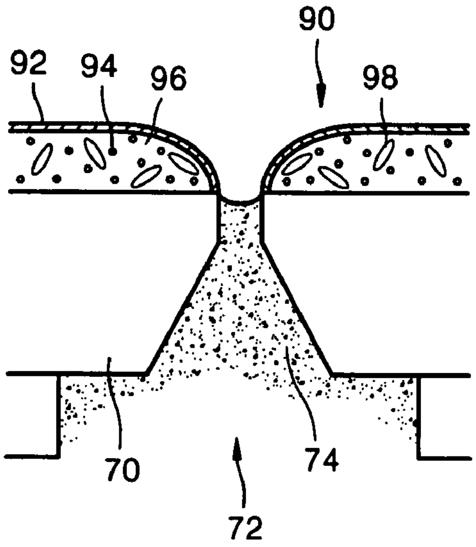
FIG. 3 (PRIOR ART)
FIG. 3 illustrates a cross-sectional view of another conventional ink-jet printhead having a fluorine resin-containing water-repellent layer on a surface of a nozzle plate.

Korean Patent Application No. 10-2004-0013562, filed on Feb. 27, 2004, in the Korean Intellectual Property Office, and entitled: "Method of Forming a Hydrophobic Coating Layer on a Surface of a Nozzle Plate for an Ink-jet Printhead," is incorporated by reference herein in its entirety.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the figures, the dimensions of elements, layers and regions are exaggerated for clarity of illustration. It will also be understood that when a layer is referred to as being "on" another layer or substrate, it can be directly on the other layer or substrate, or intervening layers may also be present. Further, it will be understood that when a layer is referred to as being "between" two layers, it can be the only layer between the two layers, or one or more intervening layers may also be present. Like reference numerals refer to like elements throughout.

FIGS. 4A through 4E illustrate cross-sectional views of sequential stages in a method of forming a hydrophobic coating layer on a surface of a nozzle plate according to an exemplary embodiment of the present invention. It is noted that while a common nozzle plate includes several tens to several hundreds of nozzles arranged in one or more arrays, FIGS. 4A through 4E illustrate only an exemplary one nozzle from among the plurality of nozzles formed in a nozzle plate for clarity of illustration.

Figure 4A:
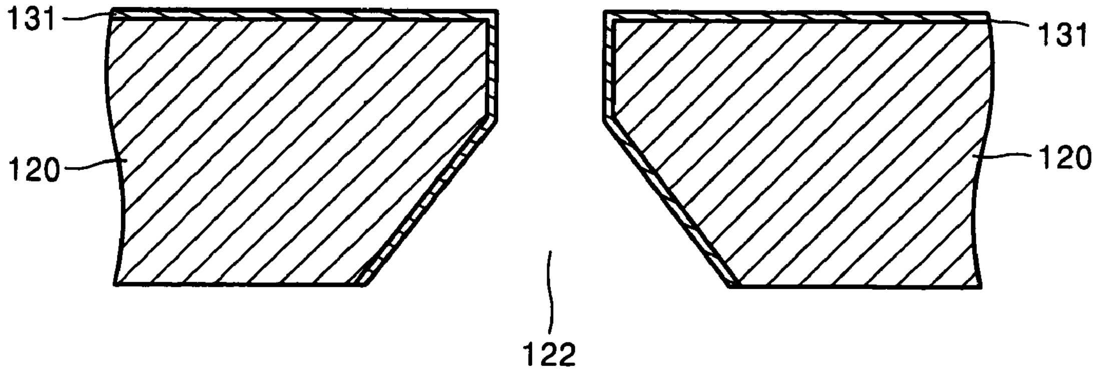
FIGS. 4A through 4E illustrate cross-sectional views of sequential stages in a method of forming a hydrophobic coating layer on a surface of a nozzle plate of an ink-jet printhead according to an exemplary embodiment of the present invention.

Initially, referring to FIG. 4A, a nozzle plate 120 having a nozzle 122 is prepared. The nozzle plate 120 may preferably be a silicon wafer because a silicon wafer is widely used in semiconductor device fabrication and is effective in mass production. Alternatively, the nozzle plate 120 may be a glass substrate or a metal substrate, instead of a silicon wafer.

An insulating layer 131, e.g., a silicon oxide layer, may be preferably formed on a surface of the nozzle plate 120 and an inner surface of the nozzle 122. Due to a hydrophilic characteristic of silicon oxide, the silicon oxide layer 131 has advantages in that it makes the inner surface of the nozzle 122 hydrophilic and has little reactivity to ink. The silicon oxide layer 131 may be formed by wet or dry oxidation of the nozzle plate 120 in an oxidizing furnace. Alternatively, a chemical vapor deposition (CVD) process may be used.

Figure 4B:
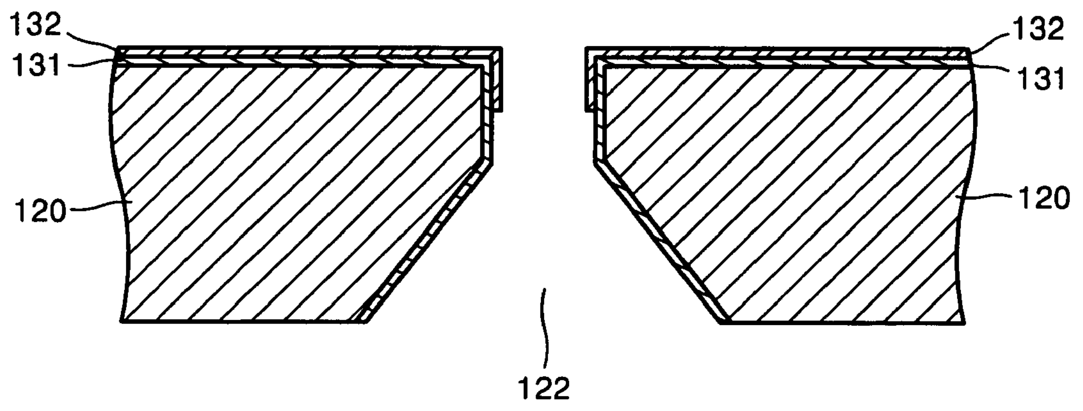

Referring to FIG. 4B, a metal layer 132 is formed on a surface of the nozzle plate 120 thus prepared. As described above, when the silicon oxide layer 131 is formed on the surface of the nozzle plate 120, the metal layer 132 is formed on a surface of the silicon oxide layer 131. More specifically, the metal layer 132 may be formed by depositing a metal material to a predetermined thickness on a surface of the nozzle plate 120, e.g., by sputtering or E-beam evaporation. It is preferable to form the metal layer 132 using E-beam evaporation, which ensures a high degree of uniformity. Further, it is preferable to deposit the metal material while rotating the nozzle plate 120. As will be subsequently described in greater detail, the metal material may be a metal capable of chemically adsorbing a sulfur compound, e.g., gold (Au), silver (Ag), copper (Cu), or indium (In). In particular, it is preferable to use Au, which has excellent characteristics with respect to chemical and physical stability.

In the operation shown in FIG. 4B, the metal layer 132 may also be deposited on an inner surface of the nozzle 122, in addition to an outer surface of the nozzle plate 120. Further, the metal layer 132 may be formed non-uniformly on different areas of the nozzle plate 120 and different portions of the nozzle 122. In this case, as described above, a non-uniform hydrophobic coating layer may be formed, thereby lowering the ejection performance of ink droplets.

The present invention obviates the formation of a non-uniform hydrophobic coating layer using the following operations.

Figure 4C:
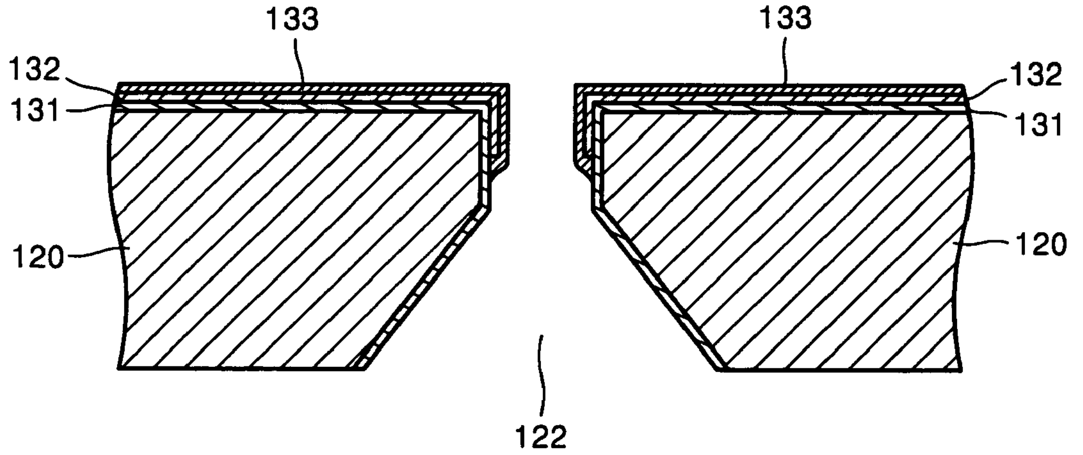

Referring to FIG. 4C, a material layer 133 covering the metal layer 132 is formed. The material layer 133 may preferably be a silicon oxide layer having the advantages as described above. Since the material layer 133 must also be formed on a surface of the metal layer 132 formed on an inner surface of the nozzle 122, which has a narrow width, it is preferable to form the material layer 133 using plasma-enhanced chemical vapor deposition (PE-CVD) suitable for a structure with a relatively high aspect ratio. By performing such a deposition, the entire surface of the metal layer 132 formed on an outer surface of the nozzle plate 120 and on an inner surface of the nozzle 122 is covered with the material layer 133, as shown in FIG. 4C.

Figure 4D:
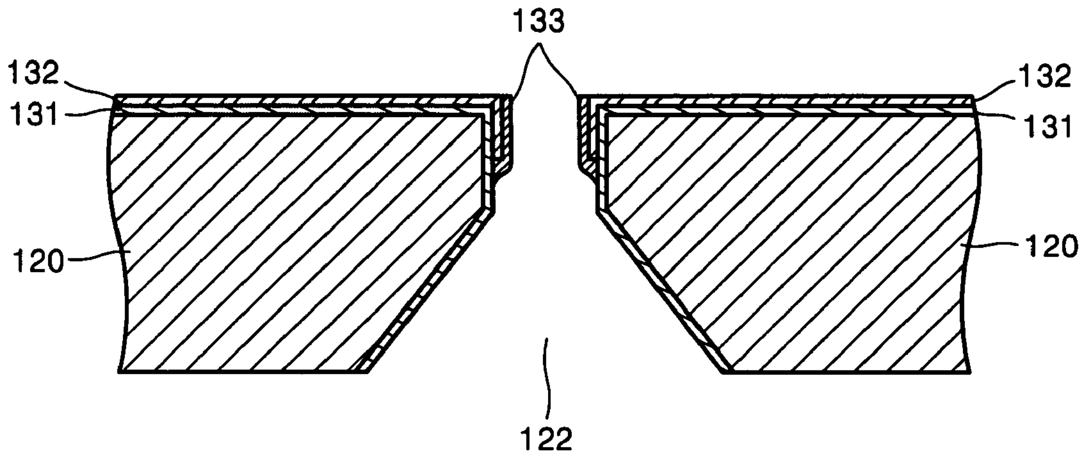

Referring to FIG. 4D, the material layer 133 is then selectively etched to expose the metal layer 132 formed on the outer surface of the nozzle plate 120. More specifically, the material layer 133 is dry-etched in a vertical direction with respect to a surface of the nozzle plate 120. The material layer 133 may preferably be etched by Reactive Ion Etching (RIE), which ensures a high degree of uniformity. As a result of this etching, only the material layer 133 formed on the outer surface of the nozzle plate 120 is selectively etched and the material layer 133 formed on the inner surface of the nozzle 122 remains, as shown in FIG. 4D. Accordingly, the metal layer 132 formed on the outer surface of the nozzle plate 120 is exposed.

Figure 4E:
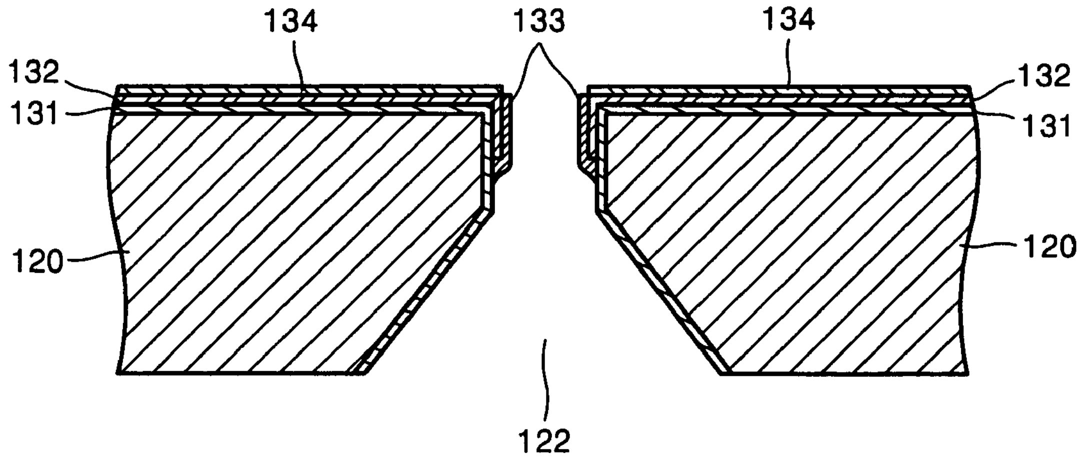

Referring to FIG. 4E, the nozzle plate 120 is then dipped in a sulfur compound-containing solution. During this procedure, a sulfur compound in the solution is chemically adsorbed to the metal material, e.g., Au, in the metal layer 132. As a result, a hydrophobic coating layer 134 made of a sulfur compound is selectively formed only on an exposed surface of the metal layer 132.

In the context of the present invention, the expression "sulfur compound" is a generic term for thiol functional group-containing compounds and compounds having S—S binding reactivity for a disulfide bond. The sulfur compound is spontaneously and chemically adsorbed to the exposed surface of the metal layer 132 to form a molecular monolayer of an about two-dimensional crystal structure. The sulfur compound may preferably be a thiol compound. Further, the expression "thiol compound" is a generic term for mercapto group (—SH)-containing organic compounds, e.g., R—SH, where R is a hydrocarbon group, such as an alkyl group.

The molecular monolayer formed of the sulfur compound is too dense to be penetrated by a water molecule, which makes the molecular monolayer water-repellant, i.e., hydrophobic.

Through the above-described operations, the hydrophobic coating layer 134 is uniformly formed only on the outer surface of the nozzle plate 120, as shown in FIG. 4E. The inner surface of the nozzle 122 is formed with the hydrophilic silicon oxide layers 131 and 133, as opposed to the hydrophobic coating layer 134.

As is apparent from the above description, according to the present invention, a uniform hydrophobic coating layer is selectively formed only on an outer surface of a nozzle plate. Therefore, ink ejection performance such as ejection speed and directionality of ink droplets through a nozzle is enhanced, thereby improving print quality.

Furthermore, according to the present invention, a hydrophobic coating layer can be formed by a more simplified process, relative to a conventional process.

Exemplary embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A method of forming a hydrophobic coating layer on a surface of a nozzle plate for an ink-jet printhead, the method comprising:

preparing a nozzle plate having a nozzle;

forming a metal layer on a surface of the nozzle plate;

forming a material layer covering the metal layer;

selectively etching the material layer to expose a portion of the metal layer formed on an outer surface of the nozzle plate; and forming the hydrophobic coating layer of a sulfur compound on the exposed portion of the metal layer by dipping the nozzle plate in a sulfur-containing solution.

2. The method as claimed in claim 1, wherein the nozzle plate is silicon wafer.

3. The method as claimed in claim 2, further comprising forming an insulating layer on a surface of the nozzle plate and an inner surface of the nozzle, prior to forming the metal layer.

4. The method as claimed in claim 3, wherein the insulating layer is a silicon oxide layer.

5. The method as claimed in claim 1, wherein the nozzle plate is selected from the group consisting of a glass substrate and a metal substrate.

6. The method as claimed in claim 1, wherein forming the metal layer comprises performing one of sputtering and E-beam evaporation.

7. The method as claimed in claim 1, wherein the metal layer comprises at least a metal selected from the group consisting of gold (Au), silver (Ag), copper (Cu), and indium (In).

8. The method as claimed in claim 1, wherein the metal layer comprises gold (Au).

9. The method as claimed in claim 1, further comprising rotating the nozzle plate while forming the metal layer.

10. The method as claimed in claim 1, wherein forming the material layer comprises performing plasma-enhanced chemical vapor deposition (PE-CVD).

11. The method as claimed in claim 1, wherein the material layer is a silicon oxide layer.

12. The method as claimed in claim 1, wherein etching the material layer comprises performing Reactive Ion Etching (RIE).

13. The method as claimed in claim 1, wherein the sulfur compound is a thiol compound.

* * * * *